US011954755B2

(12) United States Patent
Lee et al.

(10) Patent No.: US 11,954,755 B2
(45) Date of Patent: Apr. 9, 2024

(54) IMAGE PROCESSING DEVICE AND OPERATION METHOD THEREOF

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Jihye Lee, Suwon-si (KR); Taegyu Lim, Suwon-si (KR); Taeoh Kim, Seodaemun-gu (KR); Hyeongmin Lee, Seodaemun-gu (KR); Sangyoun Lee, Seodaemun-gu (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 117 days.

(21) Appl. No.: 17/525,620

(22) Filed: Nov. 12, 2021

(65) Prior Publication Data

US 2022/0076062 A1   Mar. 10, 2022

Related U.S. Application Data

(63) Continuation of application No. PCT/KR2020/004561, filed on Apr. 3, 2020.

(30) Foreign Application Priority Data

May 14, 2019   (KR) .................. 10-2019-0056553

(51) Int. Cl.
*G06T 1/00*       (2006.01)
*G06F 18/213*    (2023.01)
(Continued)

(52) U.S. Cl.
CPC .............. *G06T 1/00* (2013.01); *G06F 18/213* (2023.01); *G06F 18/22* (2023.01); *G06F 18/23* (2023.01);
(Continued)

(58) Field of Classification Search
CPC ... G06T 1/00; G06T 2207/20021; G06T 5/20; G06T 2207/20081; G06T 2207/20084;
(Continued)

(56) References Cited

U.S. PATENT DOCUMENTS 10,460,230 B2   10/2019   Brothers et al.
2013/0170767 A1   7/2013   Choudhury et al.
(Continued)

FOREIGN PATENT DOCUMENTS

KR   10-2012-0088350 A   8/2012
KR   10-2013-0112501 A   10/2013
(Continued)

OTHER PUBLICATIONS

Communication dated Jul. 10, 2020, issued by the International Searching Authority in counterpart International Application No. PCT/KR2020/004561 (PCT/ISA/220, 210, 237).
(Continued)

*Primary Examiner* — Jianxun Yang
(74) *Attorney, Agent, or Firm* — Sughrue Mion, PLLC

(57) ABSTRACT

The present disclosure relates to an image processing device including: a memory configured to store one or more instructions; and a processor configured to execute the one or more instructions stored in the memory to: extract one or more input patches based on an input image; extract one or more pieces of feature information respectively corresponding to the one or more input patches, based on a dictionary including mapping information indicating mappings between a plurality of patches and pieces of feature infor-
(Continued)

mation respectively corresponding to the plurality of patches; and obtain a final image by performing a convolution operation between the extracted one or more pieces of feature information and a filter kernel.

17 Claims, 10 Drawing Sheets

(51) Int. Cl.
　　　G06F 18/22　　(2023.01)
　　　G06F 18/23　　(2023.01)
　　　G06F 18/28　　(2023.01)
　　　G06N 3/04　　(2023.01)
　　　G06V 10/44　　(2022.01)
　　　G06V 10/82　　(2022.01)

(52) U.S. Cl.
　　　CPC ........... *G06F 18/28* (2023.01); *G06N 3/04* (2013.01); *G06V 10/454* (2022.01); *G06V 10/82* (2022.01)

(58) Field of Classification Search
　　　CPC ....... G06T 1/60; G06T 3/4053; G06F 18/213; G06F 18/22; G06F 18/23; G06F 18/28; G06N 3/04; G06N 3/08; G06V 10/454; G06V 10/82; G06V 10/40
　　　See application file for complete search history.

(56) References Cited

U.S. PATENT DOCUMENTS

| | | | |
|---|---|---|---|
| 2018/0046914 A1 | 2/2018 | Li et al. | |
| 2018/0046915 A1 | 2/2018 | Sun et al. | |
| 2018/0046919 A1 | 2/2018 | Li et al. | |
| 2018/0374569 A1* | 12/2018 | Niculescu-Mizil | ... G06F 18/214 |
| 2020/0286614 A1* | 9/2020 | Do | ............ G06N 7/01 |

FOREIGN PATENT DOCUMENTS

| | | |
|---|---|---|
| KR | 10-2015-0129897 A | 11/2015 |
| KR | 10-2016-0143505 A | 12/2016 |
| WO | 2016/132152 A1 | 8/2016 |

OTHER PUBLICATIONS

Communication dated Sep. 4, 2020, issued by the Korean Patent Office in counterpart Korean Patent Application No. 10-2019-0056553.
Communication dated Mar. 26, 2021, issued by the Korean Patent Office in counterpart Korean Patent Application No. 10-2019-0056553.
Romano et al., "RAISR: Rapid and Accurate Image Super Resolution," arXiv:1606.01299v3 [cs.CV], Oct. 4, 2016, Total 31 pages.
Jeon et al., "Constructing Fast Network through Deconstruction of Convolution," arXiv:1806.07370v5 [cs.CV], Oct. 31, 2018, Total 11 pages.
Gao et al., "ChannelNets: Compact and Efficient Convolutional Neural Networks via Channel-Wise Convolutions," arXiv:1809.01330v1 [cs.CV], Sep. 5, 2018, Total 10 pages.
Dai et al., "Designing by Training: Acceleration Neural Network for Fast High-Dimensional Convolution," 32nd Conference on Neural Information Processing Systems (NeurIPS 2018), Dec. 2018, Total 10 pages.
Wang et al., "Learning Versatile Filters for Efficient Convolutional Neural Networks," 32nd Conference on Neural Information Processing Systems (NeurIPS 2018), Dec. 2018, Total 11 pages.
Wang et al., "Pelee: A Real-Time Object Detection System on Mobile Devices," 32nd Conference on Neural Information Processing Systems (NeurIPS 2018), arXiv:1804.06882v3 [cs.CV], Jan. 18, 2019, Total 10 pages.
Thomas et al., "Learning Compressed Transforms with Low Displacement Rank," arXiv:1810.02309v3 [cs.LG], Jan. 1, 2019, Total 33 pages.
Ding et al., "CirCNN: Accelerating and Compressing Deep Neural Networks Using Block-Circulant Weight Matrices," arXiv:1708.08917v1 [cs.CV], Aug. 29, 2017, Total 14 pages.
Liu et al., "Frequency-Domain Dynamic Pruning for Convolutional Neural Networks," 32nd Conference on Neural Information Processing Systems (NeurIPS 2018), Dec. 2018, Total 11 pages.
Tartaglione et al., "Learning Sparse Neural Networks via Sensitivity-Driven Regularization," arXiv:1810.11764v1 [cs.LG], Oct. 28, 2018, Total 11 pages.
Kim et al., "Paraphrasing Complex Network: Network Compression via Factor Transfer," arXiv:1802.04977v1 [cs.CV], Feb. 14, 2018, Total 10 pages.
Banner et al., "Scalable Methods for 8-bit Training of Neural Networks," arXiv:1805.11046v3 [cs.LG], Jun. 17, 2018, Total 13 pages.
Fromm et al., "Heterogeneous Bitwidth Binarization in Convolutional Neural Networks," 32nd Conference on Neural Information Processing Systems (NIPS 2018), arXiv:1805.10368v2 [cs. CV], Oct. 31, 2018, Total 10 pages.
Wang et al., "Training Deep Neural Networks with 8-bit Floating Point Numbers," 32nd Conference on Neural Information Processing Systems (NeurIPS 2018), arXiv:1812.08011v1 [cs.LG], Dec. 19, 2018, Total 11 pages.
Gueguen et al., "Faster Neural Networks Straight From JPEG," Workshop track—ICLR 2018, Dec. 2018, Total 4 pages.
Heng Liu et al., "Single image super-resolution using a deep encoder-decoder symmetrical network with iterative back projection", Neurocomputing, vol. 282, 2018, DOI: 10.1016/J.NEUCOM.2017.12.014, 8 pages total, XP85732907.
Communication dated Dec. 6, 2021 issued by the European Patent Office in counterpart European Application No. 20806144.0.
Communication issued on Feb. 22, 2024 by the European Patent Office for European Patent Application No. 20806144.0.

\* cited by examiner

IMAGE PROCESSING DEVICE AND OPERATION METHOD THEREOF

CROSS-REFERENCE TO RELATED APPLICATION(S)

This application is a Continuation Application of International Application No. PCT/KR2020/004561, filed on Apr. 3, 2020, which claims benefit of Korean Patent Application No. 10-2019-0056553, filed on May 14, 2019, in the Korean Intellectual Property Office, the disclosures of which are incorporated by reference herein in their entireties.

BACKGROUND

1. Field

Various embodiments relate to image processing devices and operation methods thereof, and more particularly, to image processing devices for reducing the amount of memory and computation required for image processing and operation methods of the image processing devices.

2. Description of Related Art

Due to the exponential growth of data traffic along with the development of computer technology, artificial intelligence (AI) has become an important trend that will drive future innovation. Because AI is a method that enables imitation of the way of thinking of humans, the AI may be almost limitlessly applied to virtually all industries. Representative technologies of AI include pattern recognition, machine learning, expert systems, neural networks, and natural language processing.

A neural network is used to model properties of biological neurons of humans by using mathematical expressions, and employs an algorithm that mimics human learning capability. The neural network may create a mapping between input data and output data by using this algorithm, and such a capability of creating the mapping may be expressed as a learning capability of the neural network. Furthermore, the neural network has a generalization ability to produce correct output data for input data not encountered during training based on a result of the training.

A convolutional neural network (CNN) may include one or more convolution layers, each of which may perform a convolution operation between input data and weights included in each kernel. In the CNN, when both the input data and output data are image data; complexity of CNN implementation is increased, and a significant amount of computation and memory is required to perform a convolution operation.

SUMMARY

Various embodiments may provide an image processing device for performing image processing by using a dictionary generated using a deep neural network (DNN) including n convolution layers and filter kernels in an n-th convolution layer of the DNN, and an operation method of the image processing device.

An image processing device according to an embodiment may reduce the amount of computation and memory required for image processing compared to when performing image processing using a DNN, while maintaining image processing performance similar to that of the image processing using the DNN.

According to an aspect of an example embodiment, an image processing device may include a memory configured to store one or more instructions; and a processor configured to execute the one or more instructions stored in the memory to: extract one or more input patches based on an input image; extract one or more pieces of feature information respectively corresponding to the one or more input patches, based on a dictionary including mapping information indicating mappings between a plurality of patches and pieces of feature information respectively corresponding to the plurality of patches; and obtain a final image by performing a convolution operation between the extracted one or more pieces of feature information and a filter kernel.

The dictionary is generated based on pieces of feature information output at an n−1-th convolution layer of a deep neural network (DNN) that includes n convolution layers and is trained to output a second image by performing image processing on a first image according to a preset purpose, and the filter kernel is based on a filter kernel included in an n-th convolution layer of the DNN.

The plurality of patches are extracted from an image input to the trained DNN, and the pieces of feature information respectively corresponding to the plurality of patches are obtained based on the pieces of feature information that respectively correspond to the plurality of patches and that are output at the n−1-th convolution layer.

The pieces of feature information that respectively correspond to the plurality of patches and that are output at the n−1-th convolution layer are clustered based on a degree of similarity among the plurality of patches and a degree of similarity among the pieces of feature information that respectively correspond to the plurality of patches and that are output at the n−1-th convolution layer.

First feature information that corresponds to a first patch among the plurality of patches and is output at the n−1-th convolution layer and second feature information that corresponds to a second patch and is output at the n−1-th convolution layer are grouped in a first cluster, first key feature information corresponding to the first duster is generated based on the first feature information and the second feature information, and the dictionary includes information related to mapping of the first patch and the second patch to the first key feature information.

The processor is further configured to execute the one or more instructions to: determine a first hash value for a first input patch among the one or more input patches; determine a first patch having the first hash value from among the plurality of patches; extract first feature information corresponding to the first patch based on the dictionary; and determine the extracted first feature information as feature information corresponding to the first input patch.

The first hash value is a value determined based on values of a subset of pixels included in the first input patch, and the subset of pixels form a preset pattern.

According to an aspect of an example embodiment, an operation method of an image processing device may include extracting one or more input patches based on an input image; extracting one or more pieces of feature information respectively corresponding to the one or more input patches, based on a dictionary including mapping information indicating mappings between a plurality of patches and pieces of feature information respectively corresponding to the plurality of patches; and obtaining a final image by performing a convolution operation between the extracted one or more pieces of feature information and a filter kernel.

According to an aspect of an example embodiment, non-transitory computer-readable medium may store instructions that, when executed by one or more processors, cause the one or more processors to: extract one or more input patches based on an input image; extract one or more pieces of feature information respectively corresponding to the one or more input patches, based on a dictionary including mapping information indicating mappings between a plurality of patches and pieces of feature information respectively corresponding to the plurality of patches; and obtain a final image by performing a convolution operation between the extracted one or more pieces of feature information and a filter kernel.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
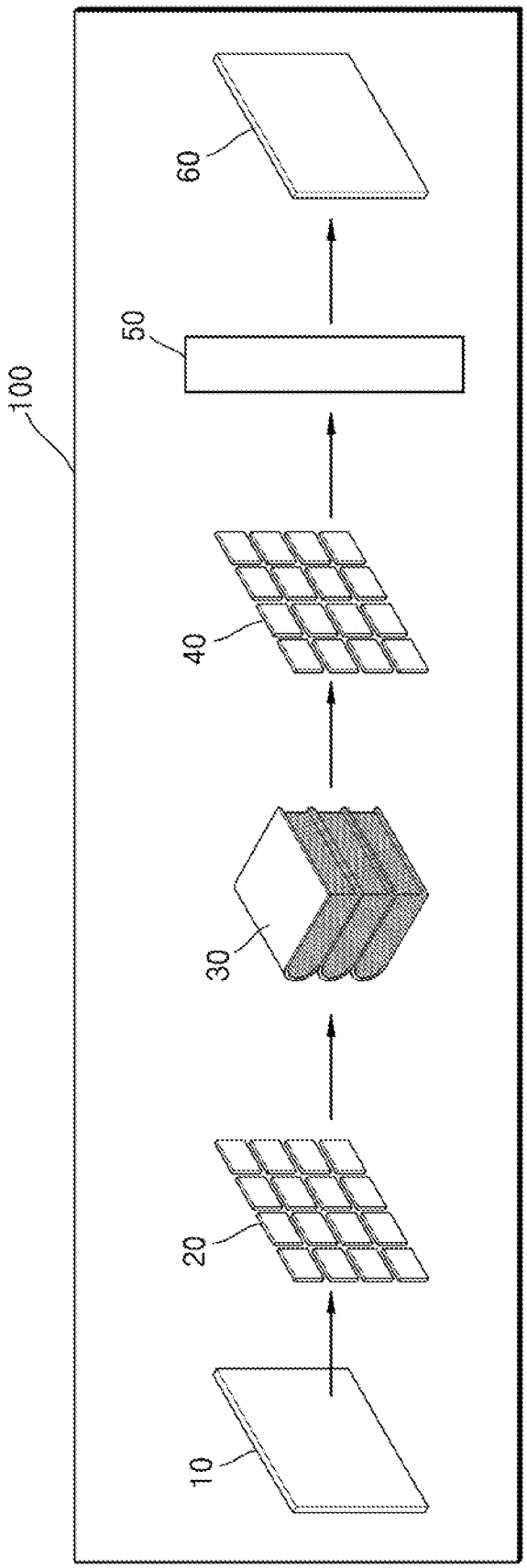
FIG. 1 is a diagram illustrating a process whereby an image processing device performs image processing, according to an embodiment.

According to an embodiment, an image processing device includes: a memory storing one or more instructions; and a processor configured to execute the one or more instructions stored in the memory to: extract one or more input patches based on an input image; extract pieces of feature information respectively corresponding to the one or more input patches based on a dictionary including mapping information indicating mappings between a plurality of patches and pieces of feature information respectively corresponding to the plurality of patches; and obtain a final image by performing a convolution operation between the extracted pieces of feature information and a filter kernel, wherein the final image is an image obtained by performing image processing on the input image according to a preset purpose.

The dictionary may be generated based on pieces of feature information output at an n−1-th convolution layer of a deep neural network (DNN) that includes n convolution layers and is trained to output a second image by performing image processing on a first image according to the preset purpose, and the filter kernel is based on a filter kernel included in an n-th convolution layer of the DNN.

The plurality of patches may be extracted from an image input to the trained DNN, and the pieces of feature information respectively corresponding to the plurality of patches may be obtained based on the pieces of feature information that respectively correspond to the plurality of patches and are output at the n−1-th convolution layer.

The pieces of feature information that respectively correspond to the plurality of patches and are output at the n−1-th convolution layer may be clustered based on a degree of similarity among the plurality of patches and a degree of similarity among the pieces of feature information that respectively correspond to the plurality of patches and are output at the n−1-th convolution layer.

First feature information that corresponds to a first patch among the plurality of patches and is output at the n−1-th convolution layer and second feature information that corresponds to a second patch and is output at the n−1-th convolution layer may be grouped in a first cluster, first key feature information corresponding to the first cluster may be generated based on the first feature information and the second feature information, and the dictionary may include information about mapping of the first and second patches to the first key feature information.

The processor may determine a first hash value for a first input patch among the one or more input patches; determine a first patch having the first hash value from among the plurality of patches; and extract first feature information corresponding to the first patch based on the dictionary and determine the extracted first feature information as feature information corresponding to the first input patch.

The first hash value may be a value determined based on values of some pixels included in the first input patch, and the some pixels may form a preset pattern.

According to an embodiment, an operation method of an image processing device includes: extracting one or more input patches based on an input image; extracting pieces of feature information respectively corresponding to the one or more input patches based on a dictionary including mapping information indicating mappings between a plurality of patches and pieces of feature information respectively corresponding to the plurality of patches; and obtaining a final image by performing a convolution operation between the extracted pieces of feature information and a filter kernel, wherein the final image is an image obtained by performing image processing on the input image according to a preset purpose.

Terms used in the present specification will now be briefly described and then embodiments of the present disclosure will be described in detail.

As the terms used herein, general terms that are currently widely used are selected by taking functions in the present disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the present disclosure.

Throughout the specification, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

Embodiments of the present disclosure will now be described more fully hereinafter with reference to the accompanying drawings so that they may be easily implemented by one of ordinary skill in the art. However, the present disclosure may have different forms and should not be construed as being limited to the embodiments set forth herein. Parts not related to descriptions of the present disclosure are omitted to clearly explain the present disclosure in the drawings, and like reference numerals denote like elements throughout.

FIG. 1 is a diagram illustrating a process whereby an image processing device performs image processing, according to an embodiment.

Referring to FIG. 1, an image processing device 100 according to an embodiment may perform image processing on an input image 10 according to a preset purpose, and output a final image 60 as a result of the image processing. In this case, the final image 60 may be a high-resolution image obtained by increasing a resolution of the input image 10, However, the final image 60 is not limited thereto.

The image processing device 100 may extract a plurality of input patches 20 based on the input image 10. In this case, the plurality of input patches 20 may have the same size. Furthermore, the image processing device 100 may extract the plurality of input patches 20 from the input image 10 so that the plurality of input patches 20 do not overlap one another. For example, when the size of the input image 10 is 50×50, the image processing device 100 may extract 25 patches having a size of 10×10 so that the plurality of input patches 20 do not overlap one another.

Alternatively, the image processing device 100 may extract the plurality of input patches 20 from the input image 10 so that the plurality of input patches 20 overlap one another only in some regions.

For example, the image processing device 100 may extract an input patch having a size of 10×10 from a first region on a top left of the input image 10 and then extract an input patch having a size of 10×10 from a second region to which the first region is moved rightwards by one pixel. In this way, the image processing device 100 may move a region by one pixel from left to right or top to bottom to a new region in the input image 10 and extract an input patch having a size of 10×10 from the new region. Accordingly, 36 patches having a size of 10×10 may be extracted from the input image 10 having a size of 50×50. However, the present disclosure is not limited thereto, and input patches may be extracted using various other methods.

The image processing device 100 may extract, based on a dictionary 30, pieces of feature information 40 respectively corresponding to a plurality of input patches. According to an embodiment, the dictionary 30 includes mapping information indicating mappings between a plurality of patches and pieces of feature information respectively corresponding to the plurality of patches. For example, when a first patch corresponds to first feature information and a second patch corresponds to second feature information, the dictionary 30 may include mapping information indicating "first patch-first feature information" and "second patch-second feature information." A method of generating a dictionary will be described in detail below.

The image processing device 100 may obtain a final image by inputting the extracted pieces of feature information 40 to a convolution layer 50. For example, the image processing device 100 may obtain the final image 60 by performing a convolution operation between the pieces of feature information 40 and a filter kernel included in the convolution layer 50. In this case, the final image 60 may be an image obtained by performing processing on the input image 10 according to a preset purpose.

Figure 2:
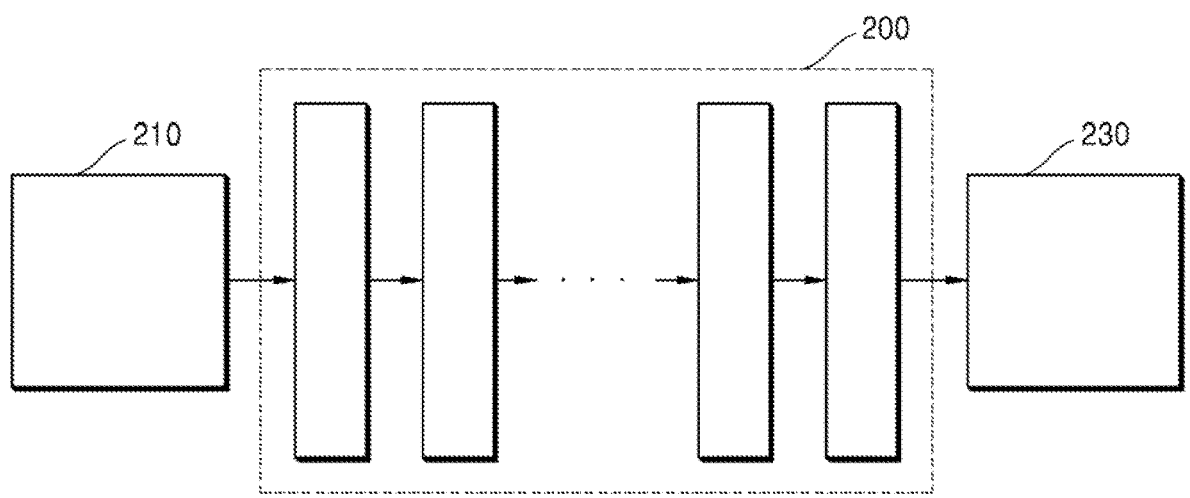
FIG. 2 is a diagram illustrating a deep neural network used to generate a dictionary, according to an embodiment.

FIG. 2 is a diagram illustrating a deep neural network (DNN) used to generate a dictionary according to an embodiment.

Referring to FIG. 2, a DNN 200 may be a convolutional neural network (CNN) including n convolution layers. It will be described hereinafter that the DNN 200 according to an embodiment is a CNN 200. For example, the CNN 200 has a structure in which input data 210 is taken as an input, the input data 210 passes through the n convolution layers, and output data 230 is output.

According to an embodiment, the image processing device 100 may extract "features" such as edges, lines, colors, etc. from an input image by using the CNN 200. Each of the n convolution layers included in the CNN 200 may receive data from a previous convolution layer, process the received data, and transmit the resulting data to a next convolution layer. For example, the image processing device 100 may generate a feature map by convolving an image input to each of convolution layers with a filter kernel including one or more weights and input the generated feature map to a next convolution layer.

Earlier convolution layers in the CNN 200 may operate to extract low-level features such as edges or gradients from an input image. Later convolution layers may extract progressively more complex features (e.g., eyes, nose, mouth, face, etc.).

One or more convolution layers that receive and output a feature map in the CNN 200 may be hidden layers (e.g., hidden convolution layers), Furthermore, in the CNN 200, other processing operations may be performed on a feature map in addition to a convolution operation performed by applying one or more filter kernels thereto. For example, an activation function operation for applying non-linear features to a feature map may be performed.

A convolution operation performed by a convolution layer will now be described in more detail with reference to FIG. 3.

A feature map 350 may be generated by performing multiplication and addition between parameters of a filter kernel 330 having a predetermined two-dimensional size (a filter kernel 330 of a size 3×3 in FIG. 3) and their corresponding pixel values in an input image 310.

Figure 3:
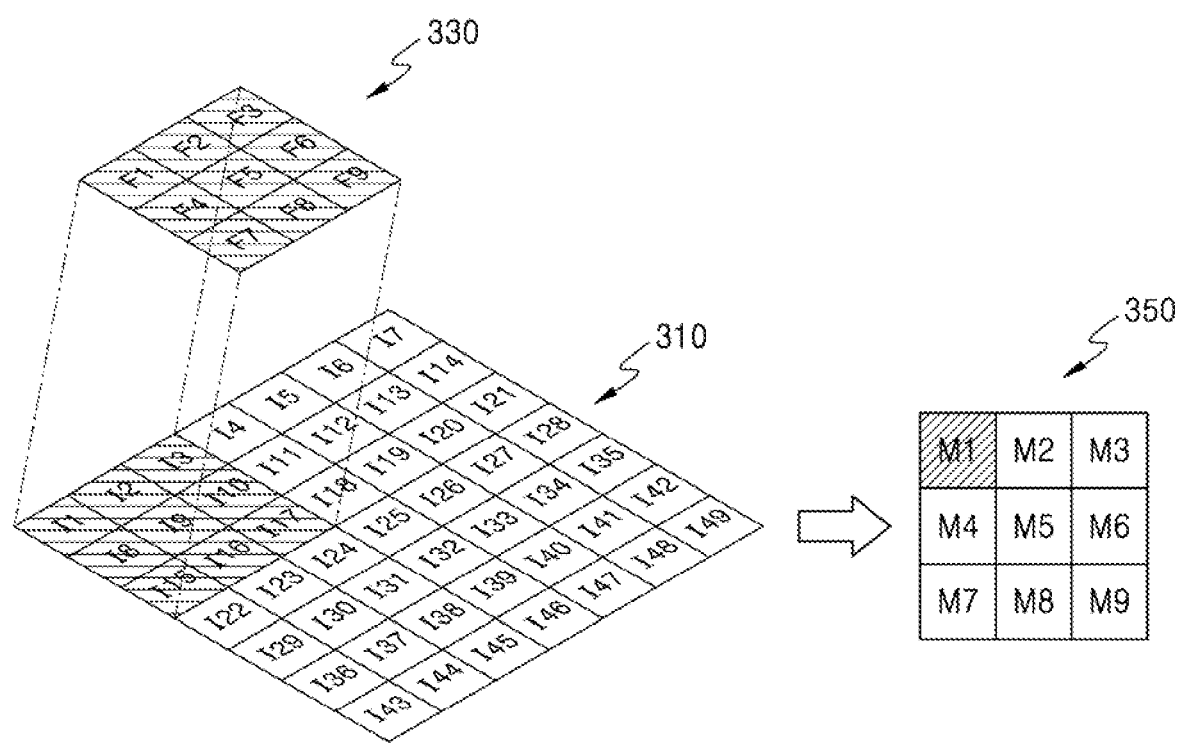
FIG. 3 is a diagram for explaining a convolution operation performed by a convolution layer.

FIG. 3 illustrates a convolution operation performed between the input image 310 and the filter kernel 330 for obtaining sample values in the feature map 350.

I1 through I49 indicated on the input image 310 in FIG. 3 represent pixels in the input image 310, and F1 through F9 indicated on the filter kernel 330 represent weights of the filter kernel 330. Furthermore, M1 through M9 indicated on the feature map 350 represent samples of the feature map 350. Weights of the filter kernel 330 may be optimized via training of a DNN.

During a convolution operation, an element-wise multiplication is performed between values of pixels I1, I2, I3, I8, I9, I10, I15, I16, and I17 in the input image 310 and corresponding weights F1 through F9 of the filter kernel 330, and a value obtained by combining (for example, adding) results of the multiplication may be assigned as a value of M1 in the feature map 350. When a stride for the convolution operation is 2, an element-wise multiplication may be performed between values of pixels I3, I4, I5, I10, I11, I12, I17, I18, and I19 in the input image 310 and their corresponding parameters F1 through F9 of the filter kernel 330, and a value of combining results of the multiplication may be assigned as a value of M2 in the feature map 350.

While the filter kernel 330 moves by a stride to a last pixel in the input image 310, the convolution operation may be performed between pixel values in the input image 310 and weights of the filter kernel 330 to obtain the feature map 350 having a certain size.

Moreover, the DNN 200 of FIG. 2 may be trained on a plurality of training data sets. For example, the plurality of training data sets may be data sets used to train a DNN for performing image processing according to a preset purpose. For example, when the preset purpose is to convert an input image into a high-resolution image, the plurality of training data sets may include training images and label images obtained by converting each of the training images into a high-resolution image. One training data set may include a training image and a label image corresponding to the training image.

For example, weight values for one or more filter kernels included in a DNN may be adjusted to reduce a difference (loss information) between an image output from the DNN by inputting a training image to the DNN and a label image corresponding to the training image input to the DNN. In this way, by training the DNN with a plurality of training data sets, weight values for filter kernels included in the DNN may be determined.

Figure 4:
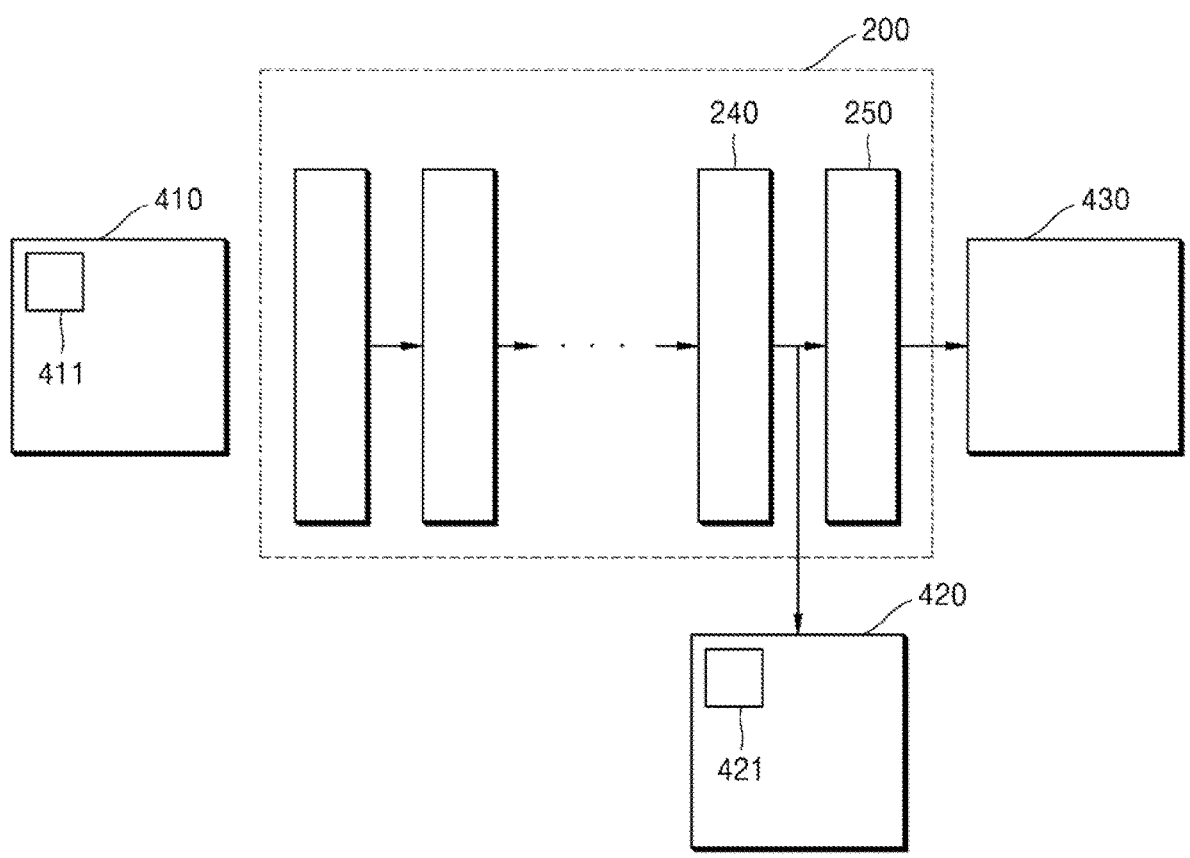
FIGS. 4 and 5 are reference diagrams for describing a method of generating a dictionary, according to an embodiment.
Figure 5:
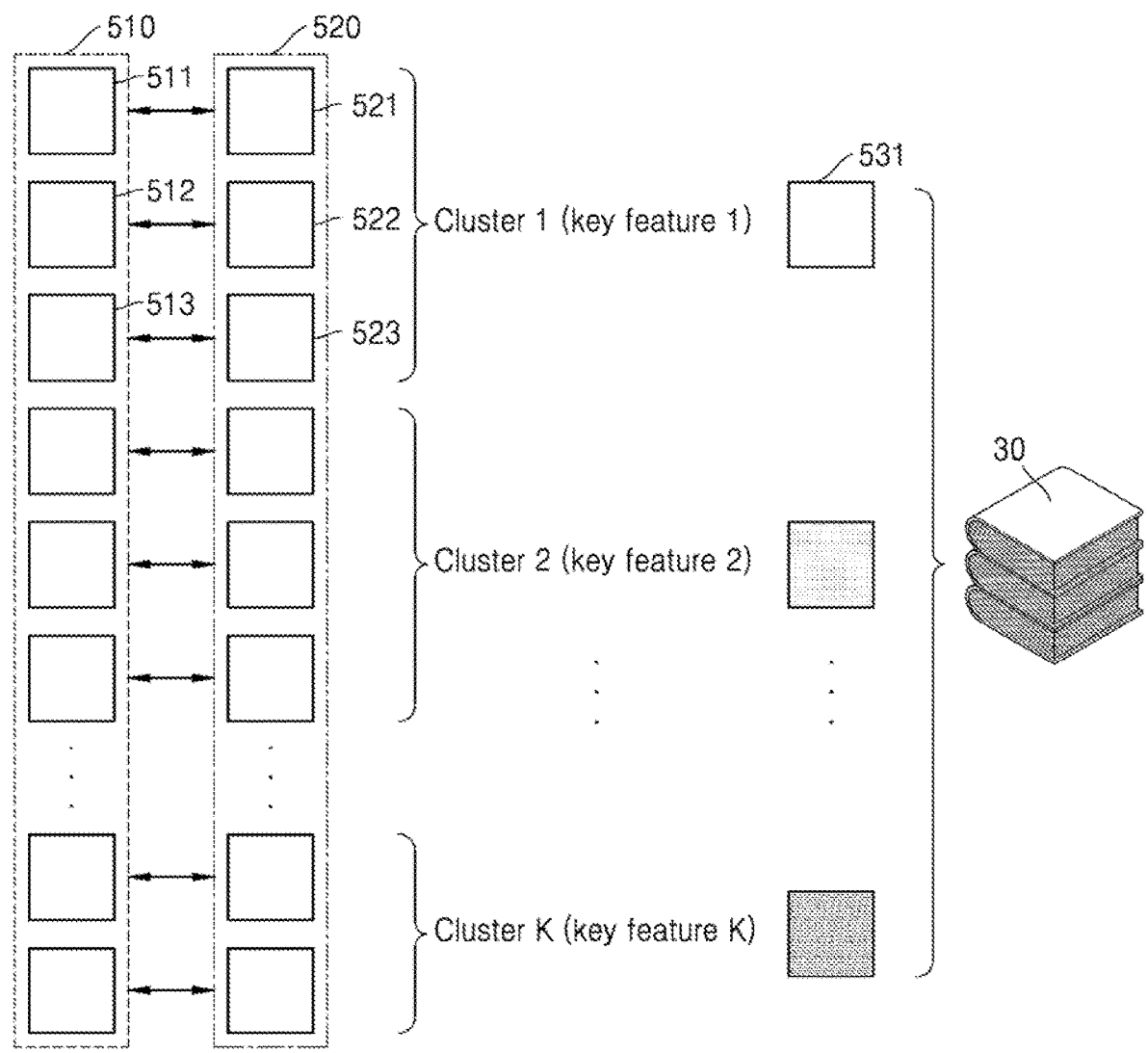

FIGS. 4 and 5 are reference diagrams for describing a method of generating a dictionary, according to an embodiment.

Referring to FIG. 4, a dictionary according to an embodiment may be generated using a DNN 200, the training of which is completed. For example, when a first image 410 is input to the DNN 200, the first image may pass through n convolution layers and a result may be output as a second image 430. In this case, each of the n convolution layers may output a feature map (feature information) by performing a convolution operation between data input to the corresponding convolution layer and a filter kernel in the convolution layer.

In this case, a dictionary may be generated using a feature map 420 (hereinafter referred to as "a first feature map") output at an n−1-th convolution layer 240.

For example, a plurality of patches may be extracted from the first image 410. In this case, the plurality of patches may have the same size, and may be extracted from the first image 410 in such a manner that they do not overlap one another or that they overlap one another only in some regions.

When the plurality of patches are extracted, pieces of feature information respectively corresponding to the plurality of patches may be extracted from the first feature map 420. For example, first feature information 421 corresponding to a first patch 411 may be extracted from a region of the first feature map 420 corresponding to a region of the first patch 411 extracted from the first image 410. However, the present disclosure is not limited thereto. A dictionary according to an embodiment may be generated by using the extracted plurality of patches and the pieces of feature information respectively corresponding to the plurality of patches.

Referring to FIG. 5, when m patches 510 are extracted from a first image, m pieces of feature information 520 respectively corresponding to the m patches 510 may be extracted from a first feature map. In this case, the m pieces of feature information 520 may be clustered. For example, the m pieces of feature information 520 may be clustered based on the degree of similarity among the m patches 510 and the degree of similarity among the m pieces of feature information 520. In this case, a patch and feature information corresponding to the patch are concatenated to generate a single vector, and vectors generated in this way may be clustered based on the Euclidean distance between vectors. However, clustering methods are not limited thereto, and pieces of feature information may be clustered using various other methods.

Referring to FIG. 5, first feature information 521 corresponding to a first patch 511, second feature information 522 corresponding to a second patch 512, and third feature information 523 corresponding to a third patch 513 may be grouped in the same cluster (a first cluster (Cluster 1)).

In addition, each cluster may have one piece of key feature information. For example, first key feature information 531 corresponding to the first cluster (Cluster 1) may be obtained based on the first feature information 521, the second feature information 522, and the third feature information 523 included in the first cluster (Cluster 1). For example, the first key feature information 531 may be obtained as a weighted sum of the first feature information 521, the second feature information 522, and the third feature information 523, but is not limited thereto.

A plurality of patches and pieces of feature information respectively corresponding to the plurality of patches may be grouped into k clusters, and k pieces of key feature information may be obtained. Accordingly, a plurality of patches may be mapped to any one of the k pieces of key feature information, and a dictionary 30 according to an embodiment may include mapping information indicating a mapping between a plurality of patches and the k pieces of key feature information.

Figure 6:
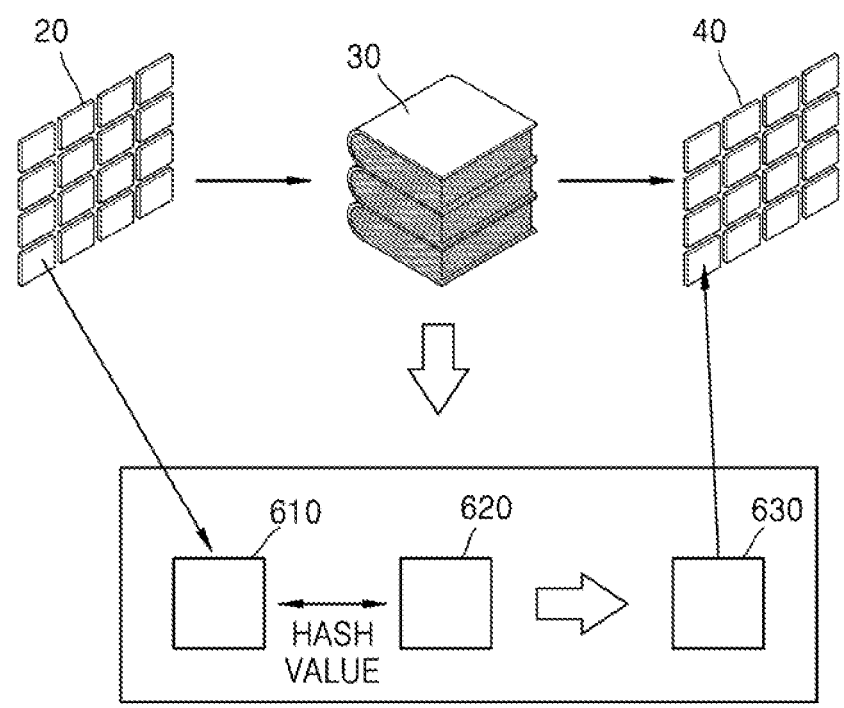
FIG. 6 is a reference diagram for describing a method, performed by an image processing device, of extracting feature information corresponding to an input patch, according to an embodiment.

FIG. 6 is a reference diagram for describing a method, performed by the image processing device 100, of extracting feature information corresponding to an input patch, according to an embodiment.

Referring to FIG. 6, the image processing device 100 may determine a hash value for each of the input patches. The image processing device 100 may calculate a hash value based on pixel values included in an input patch. For example, when an input patch has a size of 5×5 and coordinates of a center pixel are (2, 2), a hash value of the input patch may be calculated using values of the center pixel and pixels located on the same vertical line as the center pixel (e.g., pixels with coordinates (2, 1), (2, 2), (2, 3), (2, 4), and (2, 5)) and values of the center pixel and pixels located on the same horizontal line as the center pixel (e.g., pixels with coordinates (1, 2), (2, 2), (3, 2), (4, 2), and (5, 2)). However, the present disclosure is not limited thereto.

When the hash value of the input patch is determined, a patch having the same hash value as the input patch from among a plurality of patches included in a dictionary may be determined, and key feature information corresponding to the determined patch value may be extracted as feature information corresponding to the input patch.

For example, when a hash value of a first input patch 610 is determined to be a first hash value, and a hash value of a first patch 620 among the plurality of patches included in the dictionary is equal to the first hash value, first key feature information 630 mapped to the first patch 620 in the dictionary 30 may be determined as feature information corresponding to the first input patch 610.

In the same manner, by using the dictionary, the image processing device 100 may extract a plurality of pieces of feature information 40 respectively corresponding to a plurality of input patches 20 extracted from an input image. The extracted plurality of pieces of feature information 40 may be input to the convolution layer 50 of FIG. 1, and a convolution operation may be performed between a filter kernel included in the convolution layer 50 and the input pieces of feature information to obtain a final image. In this case, the filter kernel included in the convolution layer 50 may be the same as a filter kernel included in an n-th convolution layer 250 of the DNN 200, the training of which, as described with reference to FIG. 2, is completed.

Figure 7:
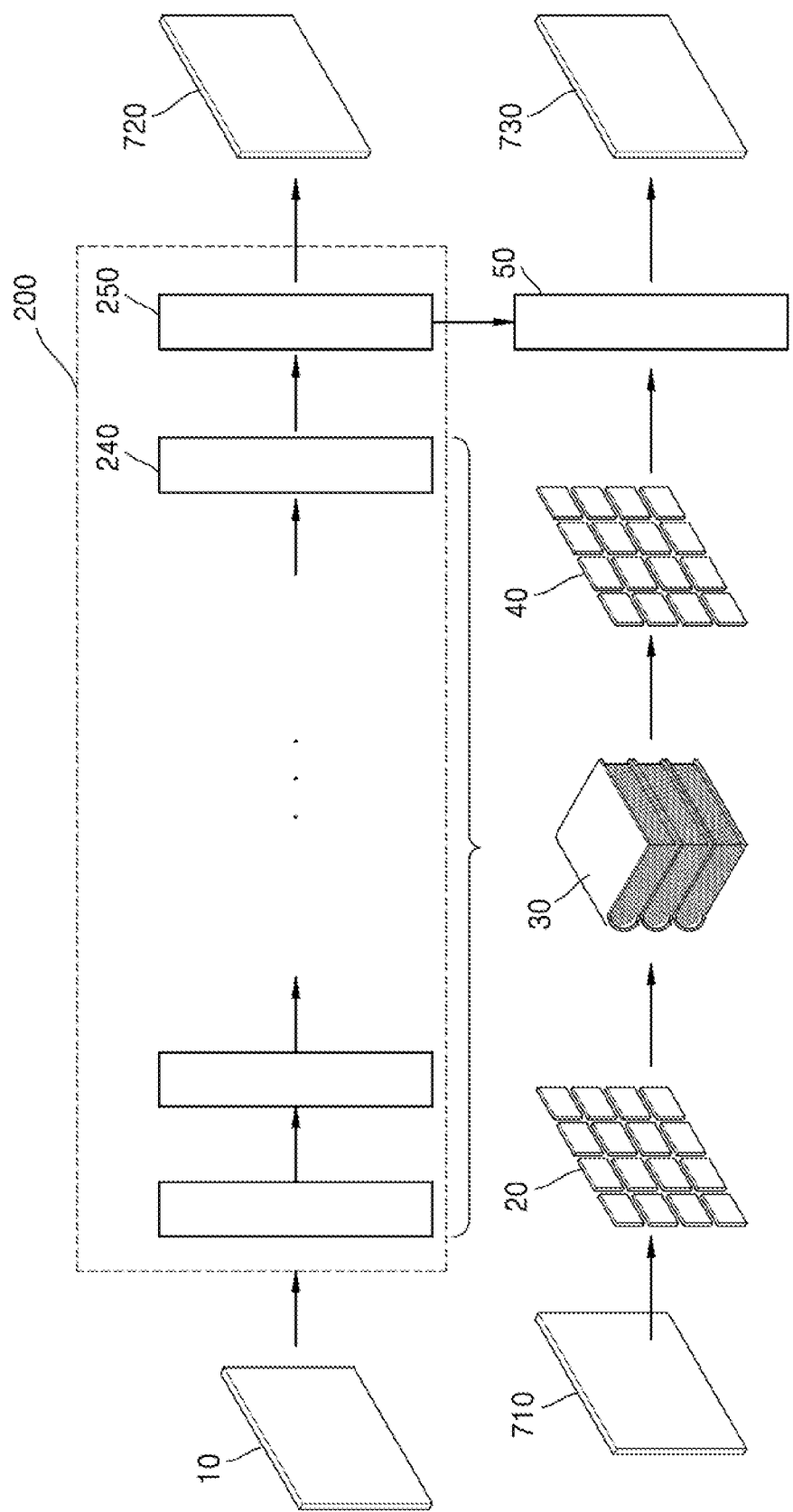
FIG. 7 is a diagram for comparing image processing using a deep neural network (DNN) with image processing using a dictionary and filter kernels, according to an embodiment.

FIG. 7 is a diagram for comparing image processing using a DNN with image processing using a dictionary and filter kernels according to an embodiment.

Referring to FIG. 7, when a first image 710 is input to a DNN 200, the training of which is completed, the first image 710 may pass through n convolution layers, and a result may be output as a second image 720. In this case, the second image 720 may be an image obtained by performing image processing on the first image 710 according to a preset purpose. When the second image 720 is generated using the DNN 200, a significant amount of computation and memory is required. Furthermore, complexity of implementation for the DNN 200 may be increased.

In contrast, as described with reference to FIGS. 1 through 6, the dictionary 30 may be generated based on pieces of feature information output at the n−1-th convolution layer 240 of the DNN 200, pieces of feature information respectively corresponding to a plurality of patches may be extracted based on the dictionary 30, and a convolution operation may be performed between the extracted pieces of feature information and a filter kernel included in the convolution layer 50 to generate a third image 730. In this case, the third image 730 may be similar to the second image 720, and the filter kernel included in the convolution layer 50 may be the same as a filter kernel in the n-th convolution layer 250 of the DNN 200, the training of which, as described with reference to FIG. 2, is completed.

In addition, when the pieces of feature information respectively corresponding to the plurality of patches are extracted using the dictionary 30, this process may require less amount of computation and memory than when performing a convolution operation as an input image passes through first through n−1-th convolution layers of the DNN 200.

Figure 8:
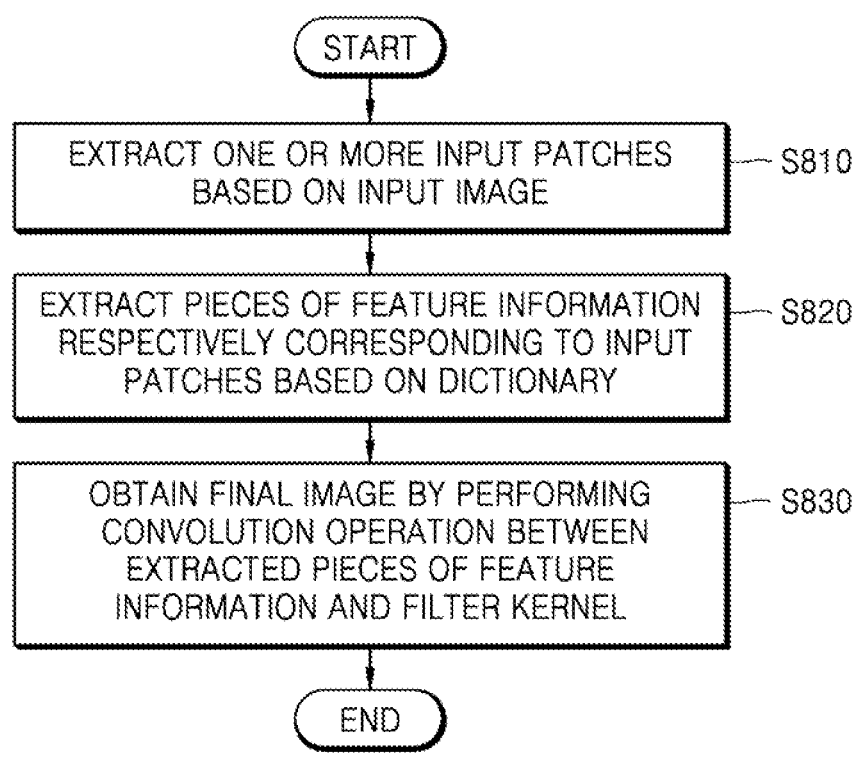
FIG. 8 is a flowchart of an operation method of an image processing device, according to an embodiment.

Thus, the amount of computation required to obtain the third image 730 from the first image 710 by using the dictionary obtained via the DNN 200, the training of which is completed, and the filter kernel in the n-th convolution layer 50 of the DNN 200 may be reduced to 1/n-th of the amount of computation required to obtain the second image 720 from the first image 710 by using the DNN 200, FIG. 8 is a flowchart of an operation method of an image processing device, according to an embodiment.

Referring to FIG. 8, according to an embodiment, the image processing device 100 may extract one or ore input patches based on an input image (operation S810).

The image processing device 100 may extract a plurality of input patches of the same size from an input image in such a manner that the plurality of input patches do not overlap one another or that the plurality of input may overlap one another only in some regions.

The image processing device 100 may extract pieces of feature information respectively corresponding to the one or more input patches based on a dictionary including mapping information indicating mappings between a plurality of patches and pieces of feature information respectively corresponding to the plurality of patches (operation S820).

According to an embodiment, the dictionary may be generated using a trained DNN including n convolution layers, as described with reference to FIGS. 4 and 5. For example, the plurality of patches and the pieces of feature information respectively corresponding to the plurality of patches may be extracted based on an image input to the DNN and pieces of feature information (feature map) output at an n−1-th convolution layer of the DNN. Furthermore, the pieces of feature information respectively corresponding to the plurality of patches may be grouped into k clusters based on the degree of similarity among the m patches 510 and the degree of similarity. In this case, because each of the k clusters has key feature information, a plurality of patches may be mapped to any one of the k pieces of key feature information, and according to an embodiment, the dictionary may include mapping information indicating a mapping between a plurality of patches and each of the k pieces of key feature information.

The image processing device 100 may determine a hash value for an input patch, determine a patch having the same hash value as the input patch from among the plurality of patches included in the dictionary, and extract key feature information mapped to the determined patch as feature information corresponding to the input patch. In the same manner, by using the dictionary, the image processing device 100 may extract pieces of feature information respectively corresponding to a plurality of input patches extracted from an input image.

The image processing device 100 may obtain a final image by performing a convolution operation between the extracted pieces of feature information and a filter kernel (operation S830).

For example, the extracted pieces of feature information may be input to a convolution layer, and the image processing device 100 may obtain a final image by performing a convolution operation between the input pieces of feature information and a filter kernel included in the convolution layer. In this case, the filter kernel included in the convolution layer may be the same as a filter kernel included in an n-th convolution layer of a trained DNN.

Figure 9:
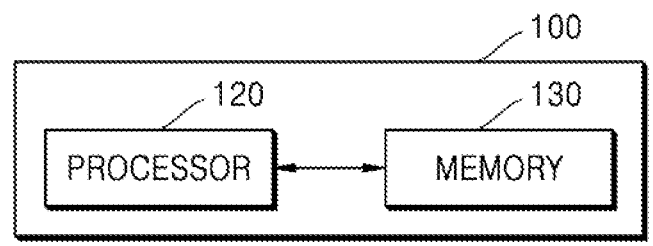
FIG. 9 is a block diagram of a configuration of an image processing device according to an embodiment.

FIG. 9 is a block diagram of a configuration of an image processing device according to an embodiment.

Referring to AG. 9, according to an embodiment, the image processing device 100 may include a processor 120 and a memory 130.

According to an embodiment, the processor 120 may control all operations of the image processing device 100. According to an embodiment, the processor 120 may execute one or more programs stored in the memory 130.

According to an embodiment, the memory 130 may store various pieces of data, programs, or applications for driving and controlling the image processing device 100. A program stored in the memory 130 may include one or more instructions. A program (one or more instructions) or an application stored in the memory 130 may be executed by the processor 120.

According to an embodiment, the processor 120 may extract a plurality of input patches having the same size from an input image. The processor 120 may extract pieces of feature information respectively corresponding to the plurality of input patches based on a dictionary including mapping information indicating mappings between a plurality of patches and pieces of feature information respectively corresponding to the plurality of patches. Because a method of generating the dictionary has been described in detail above, a detailed description thereof will be omitted below.

The processor 120 may determine a hash value for an input patch, determine a patch having the same hash value as the input patch from among the plurality of patches included in the dictionary, and extract feature information (key feature information) mapped to the determined patch as feature information corresponding to the input patch. In the same manner, by using the dictionary, the processor 120 may extract pieces of feature information respectively corresponding to the plurality of input patches extracted from the input image.

The processor 120 may obtain a final image by performing a convolution operation between the extracted pieces of feature information and a filter kernel in a convolution layer. In this case, the filter kernel included in the convolution layer may be the same as a filter kernel included in an n-th convolution layer of a trained DNN.

The processor 120 may obtain a final image by performing image processing on the input image using the dictionary and one convolution layer (the n-th convolution layer of the DNN), and the amount of computation required for image processing using a dictionary and one convolution layer according to an embodiment may be reduced to 1/n-th of the amount of computation required for image processing using a DNN.

The block diagram of the image processing device 100 is provided for illustration of an embodiment. Each of the components in the block diagram may be integrated, added, or omitted according to the specification of the image processing device 100 that is actually implemented. In other words, two or more components may be combined into a single component, or a single component may be split into two or more components when necessary. Functions performed by each block are intended to describe embodiments, and a specific operation or device related to the functions does not limit the scope of the present disclosure.

Figure 10:
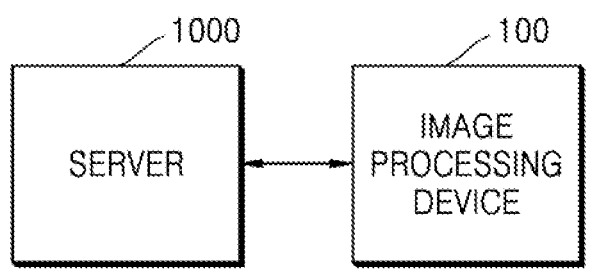
FIG. 10 is a diagram illustrating an image processing system including a server and an image processing device, according to an embodiment.

FIG. 10 is a diagram illustrating an image processing system including a server and an image processing device, according to an embodiment.

Referring to FIG. 10, according to an embodiment, a server 1000 may train the DNN 200 of FIG. 2 or obtain a DNN, the training of which is completed. The DNN 200 of FIG. 2 may be trained on a plurality of training data sets. For example, the plurality of training data sets may be data sets used to train a DNN for performing image processing according to a preset purpose. For example, when the preset purpose is to convert an input image into a high-resolution image, the plurality of training data sets may include training images and label images obtained by converting each of the training images into a high-resolution image. One training data set may include a training image and a label image corresponding to the training image. For example, weight values for one or more filter kennels included in a DNN may be adjusted to reduce a difference (loss information) between an image output from the DNN by inputting a training image to the DNN and a label image corresponding to the training image input to the DNN. In this way, by training the DNN with a plurality of training data sets, weight values for filter kernels included in the DNN may be determined.

According to an embodiment, the server 1000 may generate a dictionary by using a trained DNN. For example, the server 1000 may generate a dictionary by using a first image input to a DNN and a feature map output at an n−1-th convolution layer of the DNN.

For example, the server 1000 may extract a plurality of patches from the first image. In this case, the plurality of patches may have the same size, and may be extracted from the first image in such a manner that they do not overlap one another or that they overlap one another only in some regions. When the plurality of patches are extracted, the server 1000 may extract, from a first feature map, pieces of feature information respectively corresponding to the plurality of patches. For example, first feature information corresponding to a first patch may be extracted from a region of the first feature map corresponding to a region of the first patch extracted from the first image. However, the present disclosure is not limited thereto. The server 1000 may generate a dictionary by using the extracted plurality of patches and the pieces of feature information respectively corresponding to the plurality of patches. For example, the server 1000 may extract m patches and m pieces of feature information respectively corresponding to the m patches and duster the m pieces of feature information. In this case, the m pieces of feature information may be grouped into k dusters based on the degree of similarity among the m patches and the degree of similarity among the m pieces of feature information. Each of the k dusters may have key feature information, and a plurality of patches may be mapped to any one of k pieces of key feature information. Accordingly, the server 1000 may generate a dictionary including mapping information indicating mappings between a plurality of patches and the k pieces of key feature information.

The server 1000 may store, in a memory, the generated dictionary and values of a filter kernel included in an n-th convolution layer of the trained DNN and transmit them to the image processing device 100.

According to an embodiment, the image processing device 100 may perform image processing on an input image by using the dictionary and the filter kernel included in the n-th convolution layer of the trained DNN. Because this has been described in detail with reference to FIGS. 1 through 9, detailed descriptions thereof will be omitted herein.

An operation method of an image processing device according to an embodiment may be implemented in the form of program instructions that may be performed by various types of computers and may be recorded on non-transitory computer-readable recording media. The computer-readable recording media may include program instructions, data files, data structures, etc, either alone or in combination. The program instructions recorded on the computer-readable recording media may be designed and configured specially for the present disclosure or may be known to and be usable by those skilled in the art of computer software. Examples of the computer-readable recording media include magnetic media such as hard disks, floppy disks, and magnetic tapes, optical media such as compact disk read only memory (CD-ROM) and digital versatile disks (DVDs), magneto-optical media such as floptical disks, and hardware devices that are specially configured to store and perform program instructions, such as ROM, random access memory (RAM), flash memory, etc. Examples of program instructions include not only machine code such as that created by a compiler but also higher level language code that may be executed by a computer using an interpreter or the like.

In addition, an image processing device and an operation method of the image processing device according to embodiments of the disclosure may be included in a computer program product when provided. The computer program product may be traded, as a product, between a seller and a buyer.

The computer program product may include a software program and a computer-readable storage medium having stored the software program thereon. For example, the computer program product may include a product (e.g., a downloadable application) in the form of a software program electronically distributed by a manufacturer of an electronic device or through an electronic market (e.g., Google Play Store™, and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where a third device (e.g., a smartphone) communicatively connected to the server or client device is present, the computer program product may include a storage medium of the third device. Alternatively, the computer program product may include a software program that is transmitted from the server to the client device or the third device or that is transmitted from the third device to the client device.

In this case, one of the server, the client device, and the third device may execute the computer program product to perform methods according to embodiments of the disclosure. Alternatively, at least two of the server, the client device, and the third device may execute the computer program product to perform the methods according to the embodiments of the disclosure in a distributed manner.

For example, the server (e.g. a cloud server, an artificial intelligence (AI) server, or the like) may execute the computer program product stored in the server to control the client device communicatively connected to the server to perform the methods according to the embodiments of the disclosure.

While embodiments have been particularly described above, the embodiments are not to be construed as limiting the scope of the present disclosure, and various changes and modifications made by those of ordinary skill in the art based on a basic concept of the present disclosure also fall within the scope as defined by the following claims.

The invention claimed is:

1. An image processing device comprising:
   a memory configured to store one or more instructions; and
   a processor configured to execute the one or more instructions stored in the memory to:
   extract one or more input patches based on an input image;
   extract one or more pieces of feature information respectively corresponding to the one or more input patches, based on a dictionary including mapping information indicating mappings between a plurality of patches and pieces of feature information respectively corresponding to the plurality of patches; and
   obtain a final image by performing a convolution operation between the extracted one or more pieces of feature information and a filter kernel,
   wherein the dictionary is generated based on pieces of feature information output at an n–1-th convolution layer of a deep neural network (DNN) that includes n convolution layers and is trained to output a second image by performing image processing on a first image according to a preset purpose, and
   the filter kernel is based on a filter kernel included in an n-th convolution layer of the DNN.

2. The image processing device of claim 1, wherein the plurality of patches are extracted from an image input to the trained DNN, and
   the pieces of feature information respectively corresponding to the plurality of patches are obtained based on the pieces of feature information that respectively correspond to the plurality of patches and that are output at the n–1-th convolution layer.

3. The image processing device of claim 2, wherein the pieces of feature information that respectively correspond to the plurality of patches and that are output at the n–1-th convolution layer are clustered based on a degree of similarity among the plurality of patches and a degree of similarity among the pieces of feature information that respectively correspond to the plurality of patches and that are output at the n–1-th convolution layer.

4. The image processing device of claim 3, wherein first feature information that corresponds to a first patch among the plurality of patches and is output at the n–1-th convolution layer and second feature information that corresponds to a second patch and is output at the n–1-th convolution layer are grouped in a first cluster,
   first key feature information corresponding to the first cluster is generated based on the first feature information and the second feature information, and
   the dictionary includes information related to mapping of the first patch and the second patch to the first key feature information.

5. The image processing device of claim 1, wherein the processor is further configured to execute the one or more instructions to:
   determine a first hash value for a first input patch among the one or more input patches;
   determine a first patch having the first hash value from among the plurality of patches;
   extract first feature information corresponding to the first patch based on the dictionary; and
   determine the extracted first feature information as feature information corresponding to the first input patch.

6. The image processing device of claim 5, wherein the first hash value is a value determined based on values of a subset of pixels included in the first input patch, and the subset of pixels form a preset pattern.

7. An operation method of an image processing device, the operation method comprising:
   extracting one or more input patches based on an input image;
   extracting one or more pieces of feature information respectively corresponding to the one or more input patches, based on a dictionary including mapping information indicating mappings between a plurality of patches and pieces of feature information respectively corresponding to the plurality of patches; and
   obtaining a final image by performing a convolution operation between the extracted one or more pieces of feature information and a filter kernel,
   wherein the dictionary is generated based on pieces of feature information output at an n–1-th convolution layer of a deep neural network (DNN) that includes n convolution layers and is trained to output a second image by performing image processing on a first image according to a preset purpose, and
   the filter kernel is based on a filter kernel included in an n-th convolution layer of the DNN.

8. The operation method of claim 7, wherein the plurality of patches are extracted from an image input to the trained DNN, and the pieces of feature information respectively corresponding to the plurality of patches are obtained based on the pieces of feature information that respectively correspond to the plurality of patches and that are output at the n−1-th convolution layer.

9. The operation method of claim 8, wherein the pieces of feature information that respectively correspond to the plurality of patches and that are output at the n−1-th convolution layer are clustered based on a degree of similarity among the plurality of patches and a degree of similarity among the pieces of feature information that respectively correspond to the plurality of patches and that are output at the n−1-th convolution layer.

10. The operation method of claim 9, wherein first feature information that corresponds to a first patch among the plurality of patches and is output at the n−1-th convolution layer and second feature information that corresponds to a second patch and is output at the n−1-th convolution layer are grouped in a first cluster, first key feature information corresponding to the first cluster is generated based on the first feature information and the second feature information, and the dictionary includes information related to mapping of the first patch and the second patch to the first key feature information.

11. The operation method of claim 7, wherein the extracting of the pieces of feature information respectively corresponding to the one or more input patches comprises:

determining a first hash value for a first input patch among the one or more input patches;

determining a first patch having the first hash value from among the plurality of patches;

extracting first feature information corresponding to the first patch based on the dictionary; and determining the extracted first feature information as feature information corresponding to the first input patch.

12. The operation method of claim 11, wherein the determining of the first hash value comprises determining the first hash value based on values of a subset of pixels included in the first input patch, and wherein the subset of pixels form a preset pattern.

13. A non-transitory computer-readable medium storing instructions, the instructions comprising: one or more instructions that, when executed by one or more processors, cause the one or more processors to:

extract one or more input patches based on an input image;

extract one or more pieces of feature information respectively corresponding to the one or more input patches, based on a dictionary including mapping information indicating mappings between a plurality of patches and pieces of feature information respectively corresponding to the plurality of patches; and obtain a final image by performing a convolution operation between the extracted one or more pieces of feature information and a filter kernel, wherein the dictionary is generated based on pieces of feature information output at an n−1-th convolution layer of a deep neural network (DNN) that includes n convolution layers and is trained to output a second image by performing image processing on a first image according to a preset purpose, and the filter kernel is based on a filter kernel included in an n-th convolution layer of the DNN.

14. The non-transitory computer-readable medium of claim 13, wherein the plurality of patches are extracted from an image input to the trained DNN, and the pieces of feature information respectively corresponding to the plurality of patches are obtained based on the pieces of feature information that respectively correspond to the plurality of patches and that are output at the n−1-th convolution layer.

15. The non-transitory computer-readable medium of claim 14, wherein the pieces of feature information that respectively correspond to the plurality of patches and that are output at the n−1-th convolution layer are clustered based on a degree of similarity among the plurality of patches and a degree of similarity among the pieces of feature information that respectively correspond to the plurality of patches and that are output at the n−1-th convolution layer.

16. The non-transitory computer-readable medium of claim 15, wherein first feature information that corresponds to a first patch among the plurality of patches and is output at the n−1-th convolution layer and second feature information that corresponds to a second patch and is output at the n−1-th convolution layer are grouped in a first cluster, first key feature information corresponding to the first cluster is generated based on the first feature information and the second feature information, and the dictionary includes information related to mapping of the first patch and the second patch to the first key feature information.

17. The non-transitory computer-readable medium of claim 13, wherein the one or more instructions that cause the one or more processors to extract the pieces of feature information respectively corresponding to the one or more input patches further cause the one or more processors to:

determine a first hash value for a first input patch among the one or more input patches;

determine a first patch having the first hash value from among the plurality of patches;

extract first feature information corresponding to the first patch based on the dictionary; and determine the extracted first feature information as feature information corresponding to the first input patch.

* * * * *